(12) United States Patent
Feng et al.

(10) Patent No.: US 12,451,908 B2
(45) Date of Patent: Oct. 21, 2025

(54) PHASED ARRAY ANTENNA ARCHITECTURE

(71) Applicant: QUALCOMM INCORPORATED, San Diego, CA (US)

(72) Inventors: Yunfei Feng, San Diego, CA (US); Li Liu, San Diego, CA (US); Wu-Hsin Chen, San Diego, CA (US); Abdellatif Bellaouar, Richardson, TX (US); Chuan Wang, San Diego, CA (US); Vinod Panikkath, San Diego, CA (US); Gurkanwal Singh Sahota, Rancho Santa Fe, CA (US); Kang Yang, San Diego, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 18/082,668

(22) Filed: Dec. 16, 2022

(65) Prior Publication Data

US 2024/0204806 A1    Jun. 20, 2024

(51) Int. Cl.
| | |
|---|---|
| H04B 1/10 | (2006.01) |
| H01Q 3/28 | (2006.01) |
| H01Q 3/36 | (2006.01) |
| H04B 1/00 | (2006.01) |
| H04B 7/0413 | (2017.01) |
| H04W 56/00 | (2009.01) |

(52) U.S. Cl.
CPC ............. *H04B 1/0064* (2013.01); *H01Q 3/28* (2013.01); *H01Q 3/36* (2013.01); *H04B 7/0413* (2013.01); *H04W 56/005* (2013.01)

(58) Field of Classification Search
CPC ...... H04B 1/0064; H04B 7/0413; H01Q 3/28; H01Q 3/36; H04W 56/005
USPC .......................................................... 375/349
See application file for complete search history.

(56) References Cited

U.S. PATENT DOCUMENTS

| | | | |
|---|---|---|---|
| 2017/0331577 A1* | 11/2017 | Parkvall | ................. H04W 4/00 |
| 2020/0144733 A1* | 5/2020 | Chakraborty | ......... H01Q 1/243 |
| 2021/0119689 A1 | 4/2021 | Paramesh et al. | |
| 2021/0168003 A1* | 6/2021 | Norris | ................... H04L 5/0016 |
| 2021/0266052 A1 | 8/2021 | Fernando et al. | |
| 2022/0149917 A1 | 5/2022 | Paramesh et al. | |

FOREIGN PATENT DOCUMENTS

WO    2022170502 A1    8/2022

OTHER PUBLICATIONS

International Search Report and Written Opinion—PCT/US2023/079170—ISA/EPO—Mar. 19, 2024.

\* cited by examiner

*Primary Examiner* — Helene E Tayong
(74) *Attorney, Agent, or Firm* — Smith Tempel Blaha LLC/Qualcomm Incorporated

(57) ABSTRACT

A radio system architecture includes a receiver having multiple sub arrays in a phased array, the multiple sub arrays configured to perform carrier aggregation (CA) and multiple input multiple output (MIMO) signal processing, and provide independent beam management for multiple radio frequency (RF) signals received at each of the multiple sub arrays, and a data processor configured to receive signals from the receiver and extract information regarding wireless communications.

26 Claims, 13 Drawing Sheets

PHASED ARRAY ANTENNA ARCHITECTURE

FIELD

The present disclosure relates generally to electronics, and more specifically to wireless communication systems, and more particularly to wireless communication devices having multiple input and multiple output (MIMO) and carrier aggregation (CA) capability.

BACKGROUND

Wireless communication devices and technologies are becoming ever more prevalent as are communication systems that operate at millimeter-wave (mmW) and at near-mmW frequencies. Some communication methodologies use what is referred to as multiple input multiple output (MIMO) and also use carrier aggregation (CA), where multiple signals at one or more frequencies are processed simultaneously.

A 5G mmW communication system may be implemented that generally uses a time domain duplex (TDD) communication methodology. For a TDD system, it is important to maintain synchronicity and prevent interference, which can be challenging when switching between transmit mode and receive mode. Guard periods are used to provide isolation between transmit and receive events, with a configurable total guard time expressed as an integer number of symbols.

At a receiver in a user equipment (UE), the relative frame timing alignment is an important metric. The third generation partnership project (3GPP) has defined a maximum receive timing difference (MRTD) as a maximum relative receive timing difference that the UE must be capable of handling. The MRTD comprises a base-station relative time alignment error (TAE) and an RF propagation delay difference ($\Delta$Tprop). That is, MRTD=TAE+$\Delta$Tprop. For example, in a known 5G communication system that implemented a single 5 GHz wide downlink channel bandwidth with common beam management (CMB) to realize carrier-aggregation, the MRTD can be as stringent as 0.26 usec. Other limitations and performance degradation arises from this arrangement due to the extreme wideband channel bandwidth.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a receive system for performing carrier aggregation (CA) and multiple input multiple output (MIMO) operation at millimeter wave (mmW) frequencies, including a phased array having a plurality of groupings each having a pair of sub array structures, each sub array structure having a plurality of phased array elements and a multiplexer, each phased array element coupled to an antenna element, each phased array element having a low noise amplifier (LNA) and a phase shifter (PS), the plurality of groupings comprising a first high band (HB) grouping and a first low band (LB) grouping, a downconverter circuit selectively connected to each sub array structure in the first high band (HB) grouping and the first low band (LB) grouping, each downconverter circuit having a radio frequency (RF) amplifier, a mixer, an intermediate frequency (IF) amplifier, and a filter, and a combining circuit connected to each of the downconverter circuits selectively connected to the first high band (HB) grouping and the first low band (LB) grouping, the combining circuit configured to provide signals from each downconverter circuit to an intermediate frequency (IF) port.

Another aspect of the disclosure provides a method for signal processing, including receiving at least two radio frequency (RF) signals at a receiver, selectively phase shifting the at least two radio frequency (RF) signals, selectively directing the at least two phase shifted radio frequency (RF) signals to selected downconverter circuits, downconverting simultaneously the at least two RF signals to intermediate frequency (IF) signals, and connecting the at least two IF signals to at least one selected output port.

Another aspect of the disclosure provides a device including means for receiving at least two radio frequency (RF) signals at a receiver, means for selectively phase shifting the at least two radio frequency (RF) signals, means for selectively directing the at least two phase shifted radio frequency (RF) signals to selected downconverter circuits, means for downconverting simultaneously the at least two RF signals to intermediate frequency (IF) signals, and means for connecting the at least two IF signals to at least one selected output port.

Another aspect of the disclosure provides a radio system architecture including a receiver having multiple sub arrays in a phased array, the multiple sub arrays configured to perform carrier aggregation (CA) and multiple input multiple output (MIMO) signal processing, and provide independent beam management for multiple radio frequency (RF) signals received at each of the multiple sub arrays, and a data processor configured to receive signals from the receiver and extract information regarding wireless communications.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

A communication device may include a phased array antenna system and may include receive (Rx) MIMO capability. For example, a 5G New Radio (NR) communication device may support multiple transmitters, multiple receivers and be capable of communication on multiple communication bands. In some examples, the communication device may also include carrier aggregation (CA) where it may simultaneously communicate on multiple communication bands.

Figure 1:
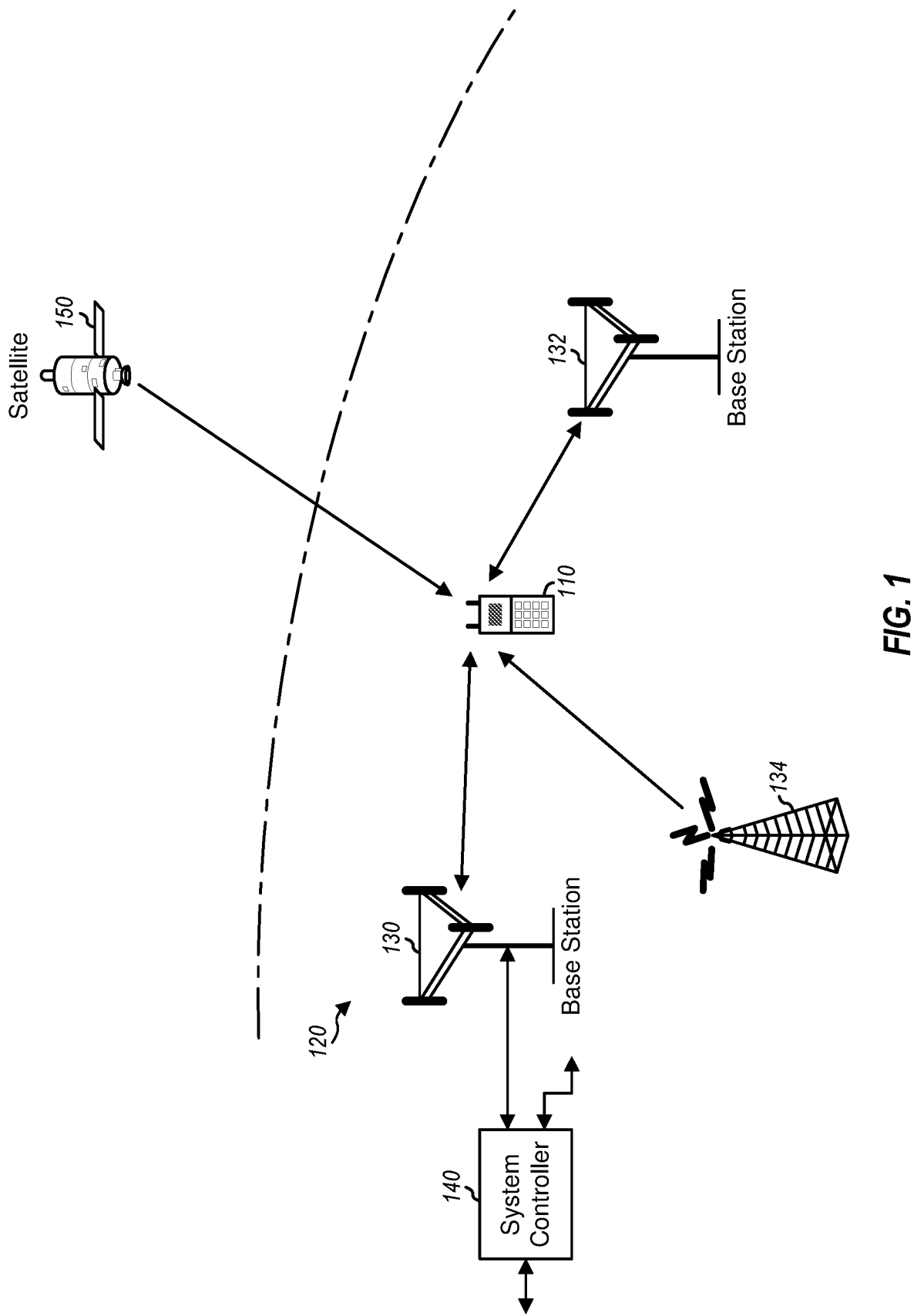
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS)), etc.). Wireless device 110 may support one or more radio technologies for wireless communication such as LTE, WCDMA, CDMA 1x, EVDO, TD-SCDMA, GSM, 802.11, 5G, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
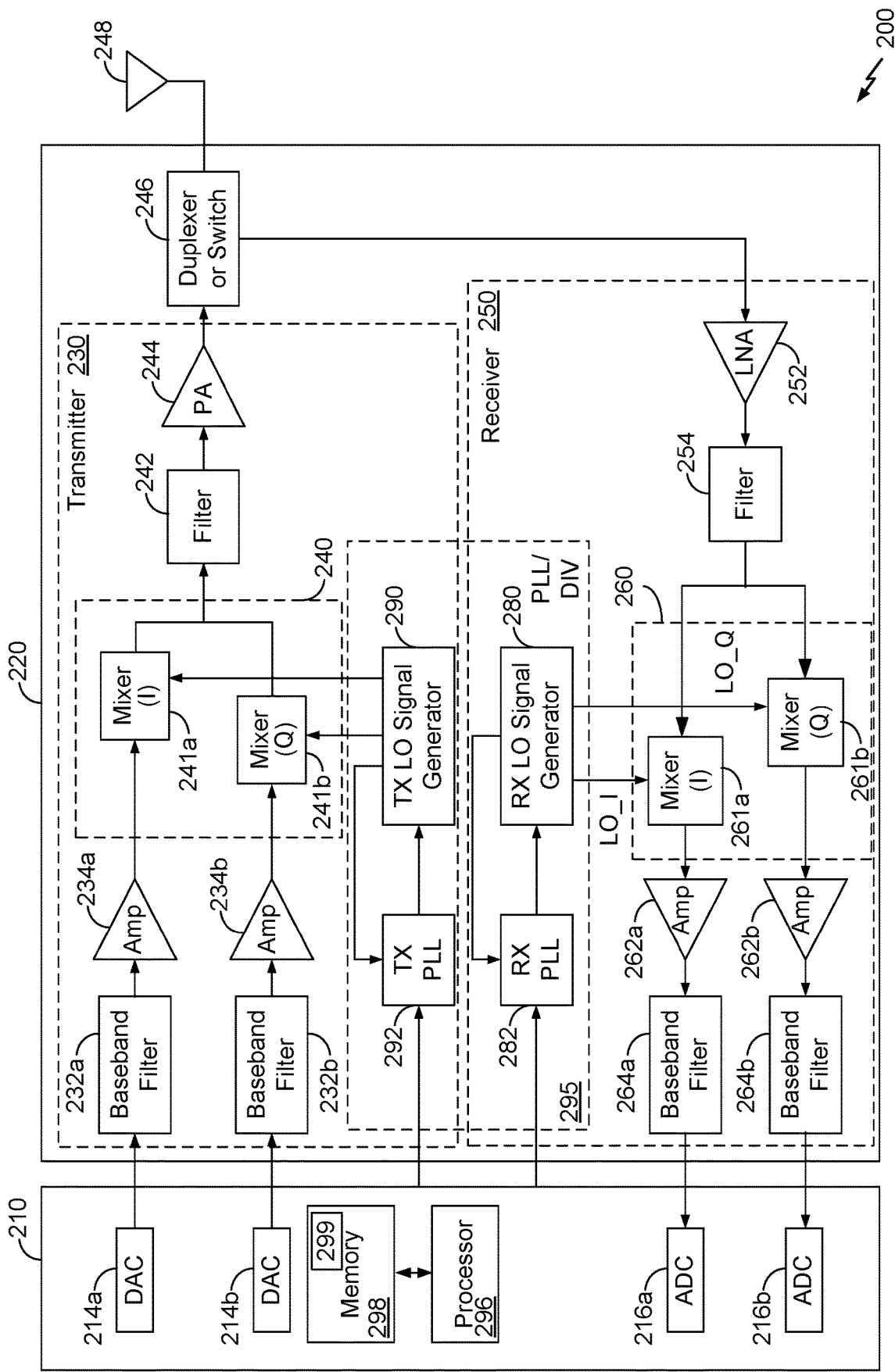
FIG. 2A is a block diagram showing a wireless device in which exemplary techniques of the present disclosure may be implemented.

FIG. 2A is a block diagram showing a wireless device 200 in which the exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250, for example phase shifters as discussed further below. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, lowpass filters 232a and 232b filter the I and Q analog transmit signals, respectively, to remove undesired images caused by the prior digital-to-analog conversion. Amplifiers (Amp) 234a and 234b amplify the signals from lowpass filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal is routed through a duplexer or switch 246 and transmitted via an antenna 248, or alternatively it can be sent to a separate transmit antenna different from a separate receive antenna. While examples discussed herein utilize I and Q signals, those of skill in the art will understand that components of the transceiver may be configured to utilize polar modulation.

In the receive path, antenna 248 receives communication signals and provides a received RF signal, which can be routed through duplexer or switch 246 and provided to a low noise amplifier (LNA) 252. The duplexer 246 is designed to operate with a specific RX-to-TX duplexer frequency separation, such that RX signals are isolated from TX signals. Alternatively, there may be a separate transmit antenna and separate receive antenna as mentioned above, in which case RX-to-TX isolation can be achieved through the limited coupling between the two antennas. In the case of separate RX and TX antennas, the RX antenna can be coupled directly to LNA 252. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by lowpass filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the filter 242, PA 244, LNA 252 and filter 254 may be implemented separately from other components in the transmitter 230 and receiver 250, and may be implemented on a millimeter wave integrated circuit. An example superheterodyne architecture is illustrated in FIG. 2B.

Figure 2B:
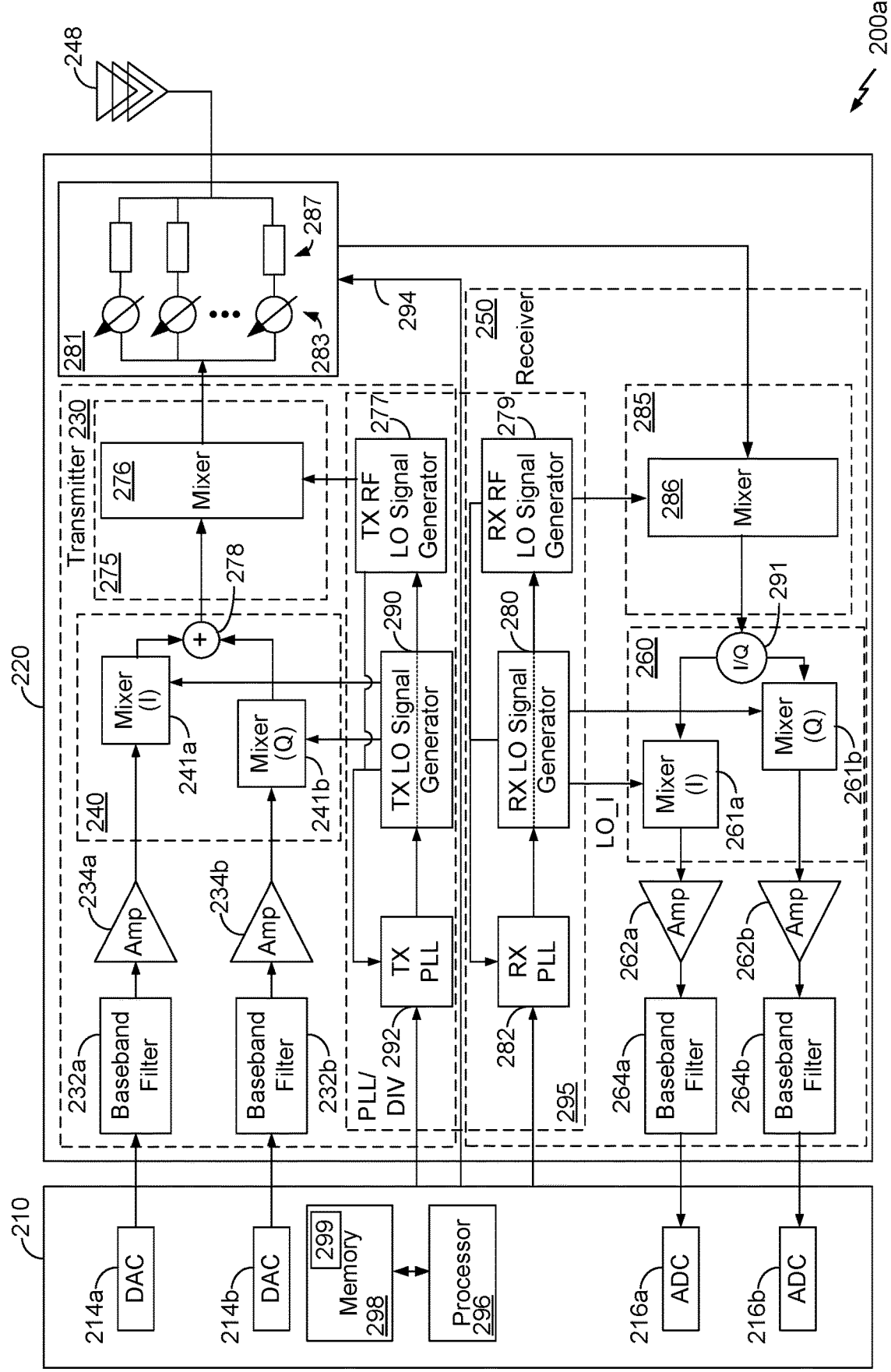
FIG. 2B is a block diagram showing a wireless device in which exemplary techniques of the present disclosure may be implemented.

FIG. 2B is a block diagram showing a wireless device in which the exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise upconversion mixer 276. The summing function 278 of upconverter 240 combines the I and the Q outputs and provides a combined signal to the mixer 276. The combined signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 of downconverter 260 receives the IF signal from the mixer 286 and generates I and Q signals in downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

In some embodiments, both the architecture illustrated in FIG. 2A and the architecture illustrated in FIG. 2B are implemented in the same device. For example, a wireless device 110 or 200 may be configured to communicate with signals having a frequency below about 7 GHZ (e.g., the FRI frequency band) using the architecture illustrated in FIG. 2A and to communicate with signals having a frequency above about 24 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B.

Figure 3:
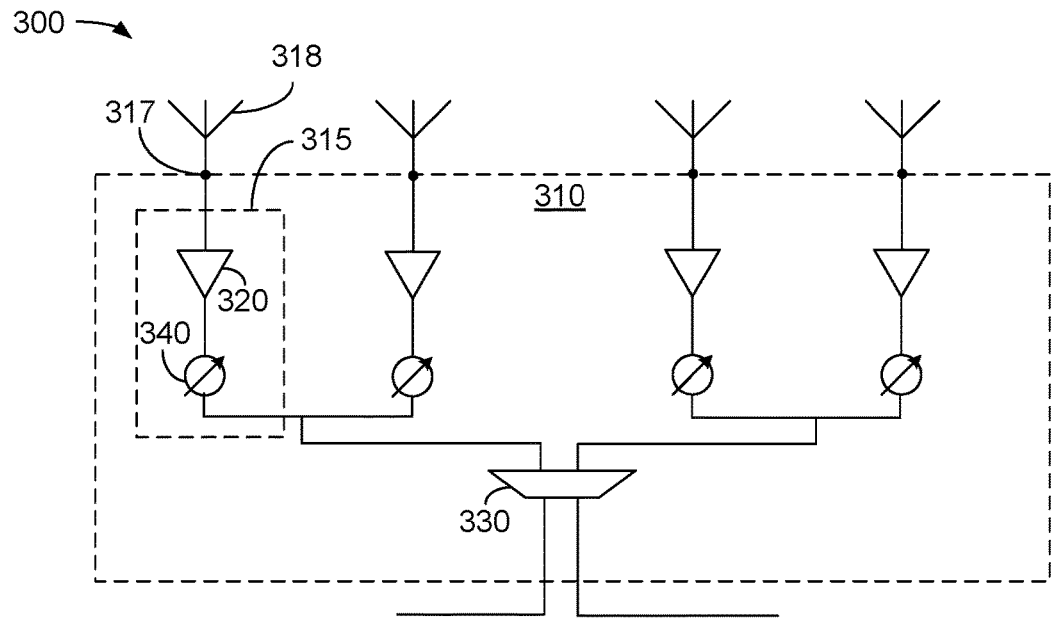
FIG. 3 shows a schematic diagram of a sub array structure of a phased array.
Figure 4:
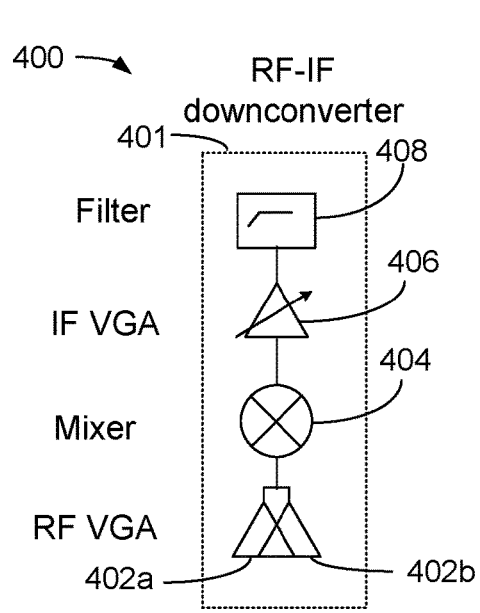
FIG. 4 shows a schematic diagram of a downconverter.

FIG. 3 shows a schematic diagram 300 of a sub array structure 310 of a phased array. The sub array structure 310 may be an example of one of a number of sub array structures that may be located in a phased array circuit, such as the phase shift circuitry 281 (FIG. 2B). In an exemplary embodiment, there may be 8 sub array structures in a phased array. The sub array structure 310 may comprise a number of phased array elements having transmit and/or receive capability. In an exemplary embodiment, an example receive phased array element 315 may comprise receive circuitry having a low noise amplifier (LNA) 320 and a phase shifter 340. In an exemplary embodiment, the sub array structure 310 may also comprise a multiplexer 330 connected to the output of each phase shifter 340. Each LNA 320 may be connected to a port 317. In a receive application, the port 317 may comprise one or more outputs of an antenna or an antenna element. An exemplary antenna element 318 is shown for reference. The antenna element 318 may be one antenna element of a phased array of antenna elements. An antenna system in a phased array may have one or more antennas and one or more antenna elements and may have one or more outputs. An example of outputs from an antenna or an antenna element 318 may be a vertical polarization (V pol) output and a horizontal polarization (H pol) output. In an exemplary embodiment, the multiplexer 330 may be configured to provide signals from two of the phase shifters 340 or all of the phase shifters 340 on a selected output to subsequent processing circuitry, such as, for example, frequency conversion circuitry (an example of which is shown in FIG. 4) that may be configured to convert the radio frequency (RF) signals to a lower frequency, referred to as an intermediate frequency (IF), and/or circuitry to combine multiple signals being output from the multiplexer 330 (for example before being provided to an IF port). In other examples, the signals received at the multiplexer 330 are combined in the multiplexer 330 and a combined signal selectively provided to the subsequent processing circuitry, such as frequency conversion circuitry. For example, the frequency conversion circuitry may be configured to convert a signal at 24 GHz or 39 GHz at the port 317 to a frequency of, for example, 10 GHz. Other frequencies are possible.

FIG. 4 shows a schematic diagram 400 of a downconverter 401. The downconverter 401 may be an example of the downconverter 285 of FIG. 2B, and in an exemplary embodiment, may be configured to downconvert a communication signal from a RF signal to an IF signal. In an exemplary embodiment, the downconverter 401 may comprise one or more variable gain amplifiers (VGAs), with exemplary VGA 402a and 402b shown for example only. The VGAs 402a and 402b may each be configured to amplify an RF signal. The downconverter 401 may also comprise a mixer 404, an IF VGA 406 and a filter 408. Outputs of the VGAs 402a, 402b are coupled together and to an input of the mixer 404. In an exemplary embodiment, the mixer 404 may be a downconversion mixer configured to convert an RF signal to an IF signal. The IF VGA 406 may be configured to amplify the IF signal and the filter 408 may be configured to remove unwanted products from the IF signal that is amplified by the IF VGA 406. In an exemplary embodiment, the RF VGAs 402a and 402b and the IF VGA 406 may be controlled by a control signal from the data processor 210 (FIG. 2B) or another controller. While examples are described herein of downconverting to IF, thereafter processing IF signals, and of an IF port, it will be understood that signals may be downconverted to baseband, that baseband signals may thereafter be processed, and that exemplary devices may include a BB port, for example in a direct conversion architecture where the mixer 404 is configured to convert between RF and baseband.

Figure 5:
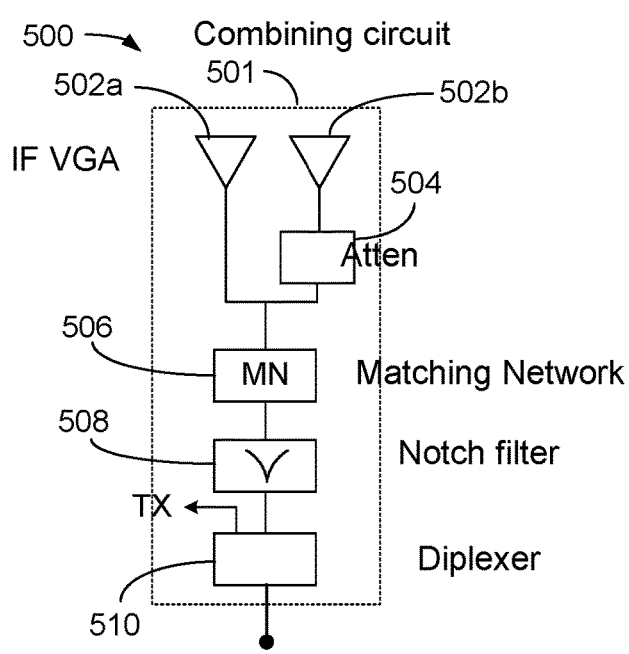
FIG. 5 shows a schematic diagram of a signal combining circuit.

FIG. 5 shows a schematic diagram 500 of a signal combining circuit 501. In an exemplary embodiment, the combining circuit 501 may comprise one or more variable gain amplifiers (VGAs), with exemplary VGA 502a and 502b shown for example only. An output of the VGA 502b may be provided to an attenuator 504. An output of the VGA 502a and the output of the attenuator 504 may be provided to a matching network 506. The matching network 506 may comprise one or more of resistive, capacitive and inductive elements configured to provide impedance matching. An output of the matching network 506 may be provided to a notch filter 508. An output of the notch filter 508 may be provided to a diplexer 510 configured to separate transmit signals and receive signals by time so as to facilitate time division duplexing (TDD) communication, for example.

Figure 6:
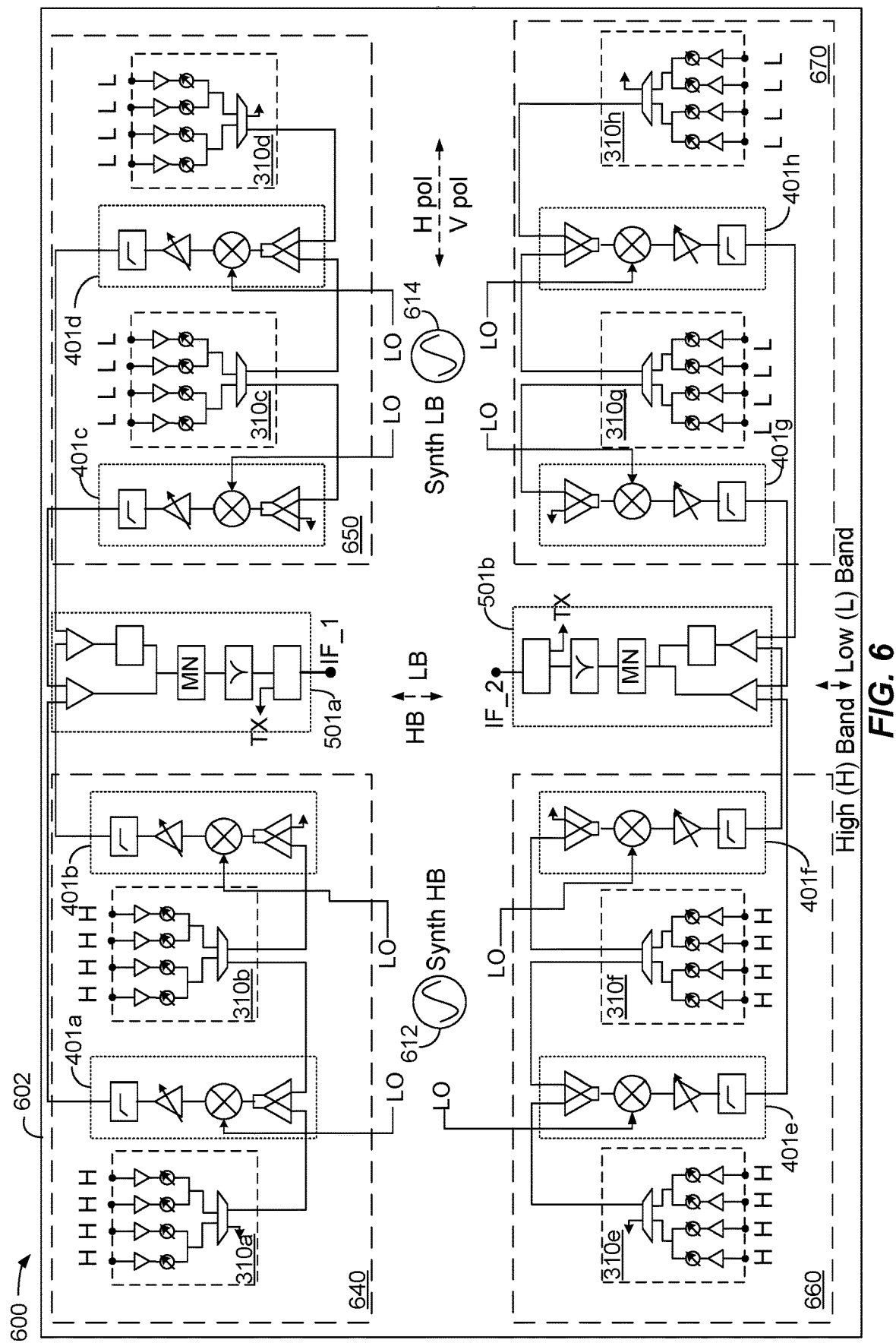
FIG. 6 shows a schematic diagram of an exemplary embodiment of a phased array.

FIG. 6 shows a schematic diagram 600 of a phased array 602. In an exemplary embodiment, the phased array 602 comprises eight (8) sub array structures 310, referred to as sub array structures 310a, 310, 310c, 310d, 310e, 310f, 310g and 310h in this example. In an exemplary embodiment, the sub array structures 310 may comprise an arrangement where the sub array structures 310c, 310d, 310g and 310h on the right hand side of the drawing are generally configured to process a signal in a particular band, such as low band, and the sub array structures 310a, 310b, 310e and 310f on the left hand side of the drawing are generally configured to process a signal in a particular band, such as high band. The terms "high" and "low" as used herein are relative. For example, a low band signal may have a frequency of approximately 24 GHz and a high band signal may have a frequency of approximately 42 GHz. Other frequencies are possible with the frequencies of 24 GHz and 42 GHz used as example only. Further, the upper sub array structures 310a, 310b, 310c and 310d may be configured to process a horizontal polarization (H pol) signal from respective antennas (e.g., from 16 respective antennas in the illustrated example) and the lower sub array structures 310e, 310f, 310g and 310h may be configured to process a vertical polarization (V pol) signal from the respective antennas (e.g., the same antennas to which the upper sub array structures 310a, 310b, 310c and 310d are coupled); however, this convention is one example of a number of different possible configurations.

In an exemplary embodiment, the sub array structures 310a and 310b associated with high band, H pol may comprise a high band, H pol quadrant 640, the sub array structures 310c and 310d associated with low band, H pol may comprise a low band, H pol quadrant 650, the sub array structures 310e and 310f associated with high band, V pol may comprise a high band, V pol quadrant 660, and the sub array structures 310g and 310h associated with low band, V pol may comprise a low band, V pol quadrant 670. Each of the quadrants 640, 650, 660 and 670 may be further divided into two sub-quadrants each having a sub array structure 310.

The phased array 602 also comprises a downconverter 401 associated with each sub array structure. Downconverters 401a and 401b may be associated with the high band H pol quadrant 640; downconverters 401c and 401d may be associated with the low band H pol quadrant 650; downconverters 401e and 401f may be associated with the high band V pol quadrant 660; and downconverters 401g and 401h may be associated with the low band V pol quadrant 670.

A synthesizer 612 may be configured to provide a local oscillator (LO) signal to the downconverters 401a, 401b, 401e and 401f and a synthesizer 614 may be configured to provide a local oscillator (LO) signal to the downconverters 401c, 401d, 401g and 401h. In an exemplary embodiment, the synthesizer 612 may also be configured to provide a local oscillator (LO) signal to the downconverters 401c, 401d, 401g and 401h by selective activation of switching circuitry (not shown); and the synthesizer 614 may also be configured to provide a local oscillator (LO) signal to the downconverters 401a, 401b, 401e and 401f by selective activation of switching circuitry (not shown).

In an exemplary embodiment, a combining circuit 501a may be associated with the H pol quadrants 640 and 650 and a combining circuit 501b may be associated with the V pol quadrants 660 and 670. The combining circuit 501a may be connected to a first IF port, IF_1; and the combining circuit 501b may be connected to a second IF port, IF_2.

In an exemplary embodiment, one or more signals may be received by one or more antenna elements and may be downconverted from RF to IF and may be present on the first IF port, IF_1 and on the second IF port, IF_2. The signals on these ports may be conveyed over an interconnect to a transceiver chip or other circuitry for further processing the one or more signals, for example optionally the downconverter 260 (e.g., when IF is used, as in this example, but the downconverter 260 may be omitted in direct conversion architectures) and the amplifiers and/or filters 262, 264. After being processed by these elements, the data processor 210 may receive the signals and further process them to extract information regarding wireless communications.

FIG. 6 is described as having four quadrants. In other examples, however, there may not be four such quadrants. For example, in implementations where certain antennas do not include both a V and an H pol, there may be less than four quadrants (e.g., just the upper half of FIG. 6 may be implemented). Other configurations in which less (or more) than four quadrants are implemented may be used. Further, while the quadrants are illustrated as being distributed in four corners of a rectangle, such representation is not limiting. The quadrants may be arranged on a chip in any number of manners. They may be linearly arranged, and they may be separated as shown, or may overlap. While certain description below recites quadrants, a "grouping" having multiple (e.g., a pair of) sub array structures may also be used to describe illustrated circuitry, such as any of 640, 650, 660, and 670.

Figure 7:
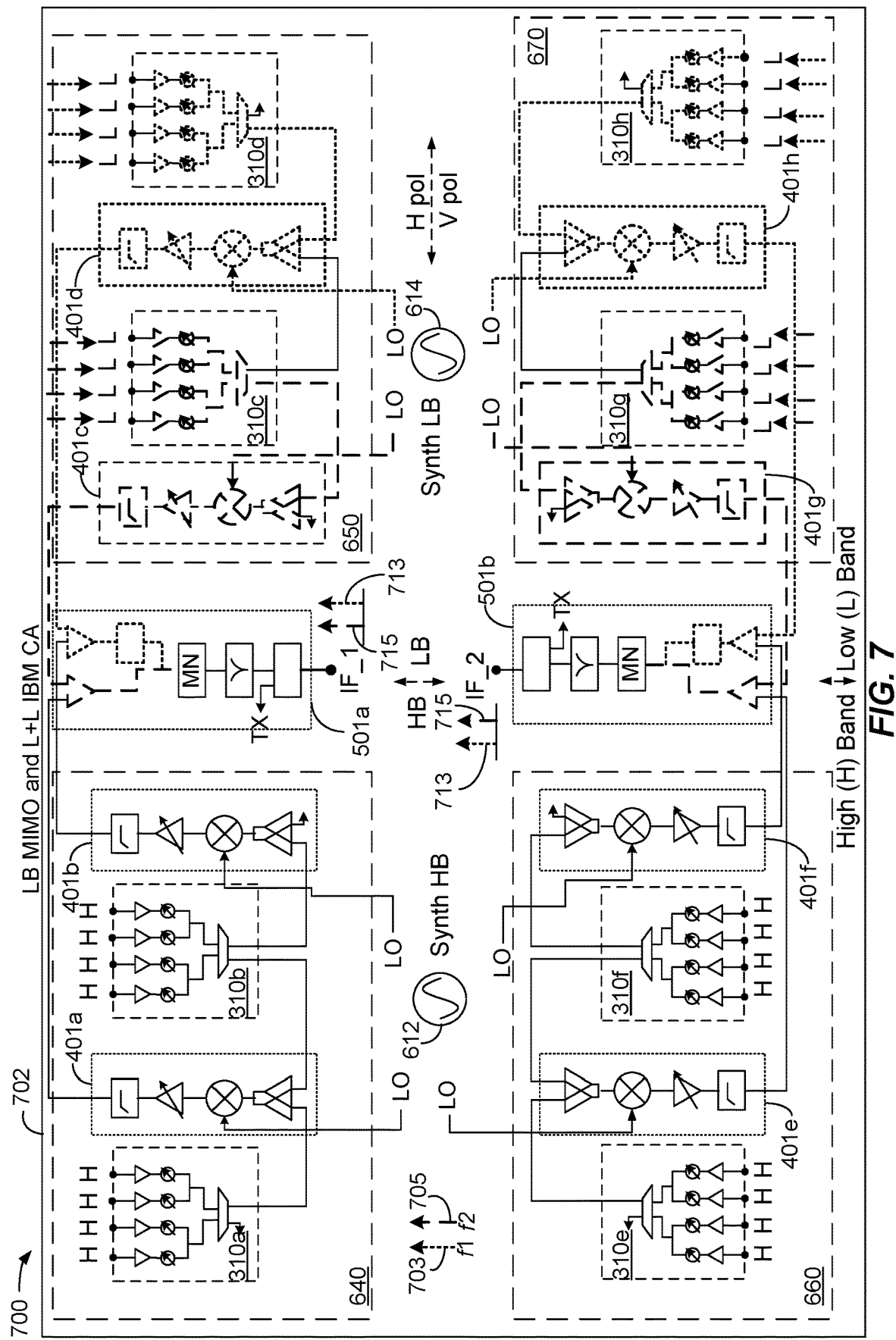
FIG. 7 shows a schematic diagram of an exemplary embodiment of a phased array.

FIG. 7 shows a schematic diagram 700 of an exemplary embodiment of a phased array 702. In FIG. 7, the phased array 702 is capable of signal processing for low band multiple input multiple output (LB MIMO) using independent beam management (IBM) and is capable of signal processing for two LB signals using independent beam management (IBM) in a carrier aggregation (CA) system. An example of signal processing for two LB signals using IBM in a CA system is illustrated, and the components in this example that process a first communication signal at a first frequency are arbitrarily illustrated using bold dotted lines and the components in this example that process a second communication signal at a second frequency are arbitrarily illustrated using bold dashed lines. In an exemplary embodiment, a first RF communication signal at a first frequency (f1) is shown using the arrow 703 and a second RF communication signal at a second frequency (f2) is shown using the arrow 705. In an exemplary embodiment, the signals represented by the arrows 703 and 705 may be low band signals at different frequencies in this example.

In an exemplary embodiment, the phased array 702 may be configured such that the first RF communication signal at the first frequency (f1) 703 is received by some or all of the antenna ports on the sub array structure 310d and the sub array structure 310h; and the second RF communication signal at the second frequency (f2) 705 is received by some or all of the antenna ports on the sub array structure 310c and the sub array structure 310g. In the example shown in FIG. 7, the first RF communication signal at the first frequency (f1) 703 is received by all of the antenna ports on the sub array structure 310d and the sub array structure 310h; and the second RF communication signal at the second frequency (f2) 705 is received by all of the antenna ports on the sub array structure 310c and the sub array structure 310g. However, the RF communication signals can be received by fewer than all of the antenna ports on any given sub array structure by selectively enabling the LNA 320 and the phase shifter 340 on any sub array structure. For example, the RF communication signals can be received by two of the four antenna ports on one or more of the sub arrays. The first RF communication signal at the first frequency (f1) 703 from an H pol antenna port may be provided by the multiplexer in the sub array structure 310d to the downconverter 401d and processed by the downconverter 401d, and the first RF communication signal at the first frequency (f1) 703 from a V pol antenna port may be provided by the multiplexer in the sub array structure 310h to the downconverter 401h and processed by the downconverter 401h. For example, the downconverter 401d and the downconverter 401h may receive a local oscillator (LO) signal at a first frequency and can downconvert the first RF communication signal at the first frequency (f1) 703 to a first intermediate frequency (IF1) signal 713.

The second RF communication signal at the second frequency (f2) 705 from an H pol antenna port may be provided by the multiplexer in the sub array structure 310c to the downconverter 401c and processed by the downconverter 401c, and the second RF communication signal at the second frequency (f2) 705 from a V pol antenna port may be provided by the multiplexer in the sub array structure 310g to the downconverter 401g and processed by the downconverter 401g. For example, the downconverter 401c and the downconverter 401g may receive a local oscillator (LO) signal at a second frequency and can downconvert the second communication signal at the second frequency (f2) 705 to a second intermediate frequency (IF2) signal 715.

An output of the downconverter 401d having the first communication signal at the first intermediate frequency (IF1) 713 may be provided to the combining circuit 501a; and an output of the downconverter 401h having the first communication signal at the first intermediate frequency (IF1) 713 may be provided to the combining circuit 501b.

An output of the downconverter 401c having the second communication signal at the second intermediate frequency (IF2) 715 may be provided to the combining circuit 501a; and an output of the downconverter 401g having the second communication signal at the second intermediate frequency (IF2) 715 may be provided to the combining circuit 501b.

An output IF_1 of the combining circuit 501a may have intermediate frequency (IF) signals 713 and 715 corresponding to the first communication signal at the first frequency (f1) 703, and the second communication signal at the second frequency (f2) 705, respectively.

An output IF_2 of the combining circuit 501b may have intermediate frequency (IF) signals 713 and 715 corresponding to the first communication signal at the first frequency (f1) 703, and the second communication signal at the second frequency (f2) 705, respectively.

In an exemplary embodiment, the phase shifters in the sub array structure 310d and the sub array structure 310h can be configured to operate on the first RF communication signal at the first frequency (f1) 703 to produce a given beam angle at the output of the sub array structure 310d and the output of the sub array structure 310h; and the phase shifters in the sub array structure 310c and the sub array structure 310g can be configured to operate on the second RF communication signal at the second frequency (f2) 705 to produce a given beam angle at the output of the sub array structure 310c and the output of the sub array structure 310h. For example, to produce a given beam angle at the output of the sub array structure 310d, the phase shifters 340 (FIG. 3) in the sub array structure 310d will be independently and individually controlled to produce the desired beam angle. For example, the phase shift applied by each of the phase shifters in a given sub array structure, 310d in this example, can be controlled to apply the same or different phase shift to result in the desired beam angle for the signal at the output of the sub array structure. The phase shifters 340 in all of the sub array structures can be similarly controlled to produce a given beam angle. In this manner, independent beam management (IBM) can be provided for the first RF communication signal at the first frequency (f1) 703 and for the second RF communication signal at the second frequency (f2) 705. Further, as described above, using less than all of the antenna ports in a sub array may contribute to the provision of IBM.

In this manner, two different radio frequency communication signals can be separately received and downconverted to IF to provide independent beam management (IBM) in a carrier aggregation (CA) system. In an exemplary embodiment, the phased array 702 allows independent beam management (IBM) and CA and also allows the MRTD requirement to be relaxed to approximately 8 μsec instead of the stringent common beam management (CBM) MRTD requirement of 0.26 μsec.

The example of FIG. 7 shows L+L IBM CA operation; however, the structure of the phased array 702 is also able to process signals in LB MIMO operation. For example, two instances of the same frequency signal may be received by the sub array structure 310c and the sub array structure 310d separately and processed independently using different phase shift settings, thus providing independent beam management. Similarly, instances of the same frequency signal may be received by the sub array structure 310g and the sub array structure 310h separately and processed independently using different phase shift settings.

Figure 8:
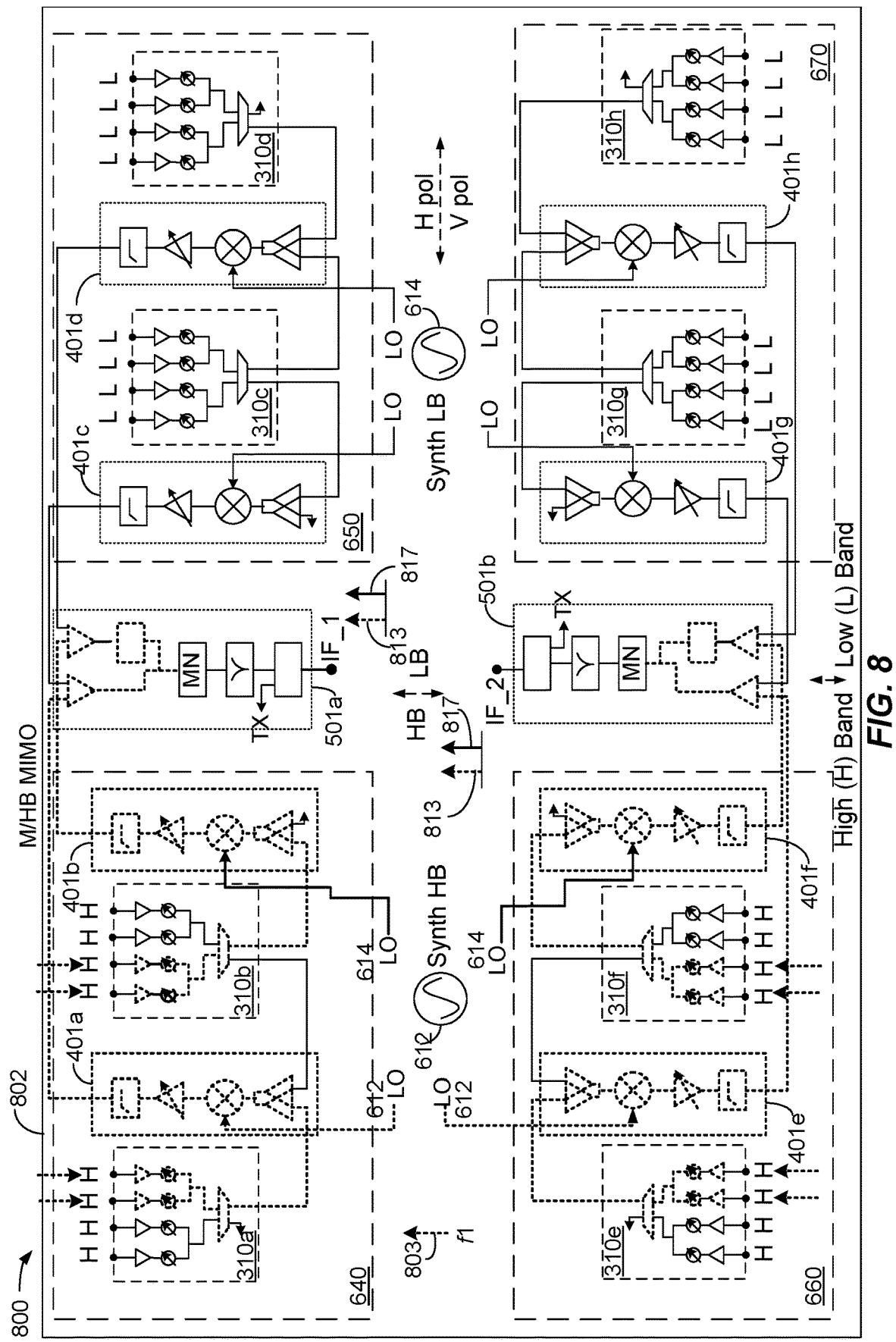
FIG. 8 shows a schematic diagram of an exemplary embodiment of a phased array.

FIG. 8 shows a schematic diagram 800 of an exemplary embodiment of a phased array 802. In FIG. 8, the phased array 802 is configured for medium/high band multiple input multiple output (M/HB MIMO) and is configured to process two medium/high band (M/HB) signals using independent beam management (IBM). The components in this example that can process a first communication signal at a first frequency are arbitrarily illustrated using bold dotted lines and the components in this example that can process a second communication signal at a second frequency are arbitrarily illustrated using bold dashed lines. In an exemplary embodiment, the phased array 802 will be described in the context of processing a single signal in a MIMO operation. However, the phased array 802 can also process signals having multiple frequencies. In an exemplary embodiment, a first RF communication signal at a first frequency (1) is shown using the arrow 803. In an exemplary embodiment, the signals represented by the arrow 803 may be a high or medium band signal. In the following example, the processing of the signal 803 will be described.

In an exemplary embodiment, the phased array 802 may be configured such that the first RF communication signal at the first frequency (f1) 803 is received by the sub array structure 310a and the sub array structure 310e; and also received by the sub array structure 310b and the sub array structure 310f. In the example shown in FIG. 8, fewer than all of the LNAs and phase shifters are enabled in the sub array structures 310a, 310b, 310e and 310f, with two exemplary LNAs and phase shifters being shown as enabled. Fewer LNAs and phase shifters may be enabled in each sub array structure 310.

The first RF communication signal at the first frequency (f1) 803 from an H pol antenna port may be provided by the multiplexer in the sub array structure 310a to the downconverter 401a and processed by the downconverter 401a and the downconverter 401b; and the first RF communication signal at the first frequency (f1) 803 from a V pol antenna port may be provided by the multiplexer in the sub array structure 310e to the downconverter 401e and processed by the downconverter 401e and the downconverter 401f. For example, the downconverter 401a and the downconverter 401e may receive a first local oscillator (LO) signal from the synthesizer 612 at a first frequency and can downconvert the first RF communication signal at the first frequency (f1) 803 to a first intermediate frequency (IF1) signal 813; and the, downconverter 401b and the downconverter 401f may receive a second local oscillator (LO) signal from the synthesizer 614 (with the LO signal shown in bold solid line) at a second frequency and can downconvert the first RF communication signal at the first frequency (f1) 803 to a second intermediate frequency (IF2) signal 817.

An output of the downconverter 401a having the first communication signal 803 at the first intermediate frequency (IF1) 813 and an output of the downconverter 401b having the first communication signal 803 at the second intermediate frequency (IF2) 817 may be provided to the combining circuit 501a; and an output of the downconverter 401e having the first communication signal 803 at the first intermediate frequency (IF1) 813 and an output of the downconverter 401f having the first communication signal 803 at the second intermediate frequency (IF2) 817 may be provided to the combining circuit 501b.

An output IF_1 of the combining circuit 501a may have intermediate frequency (IF) signals 813 and 817 corresponding to the first RF communication signal at the first frequency (f1) 803.

An output IF_2 of the combining circuit 501b may have intermediate frequency (IF) signals 813 and 817 corresponding to the first RF communication signal at the first frequency (f1) 803.

In an exemplary embodiment, the phase shifters in the sub array structure 310a, sub array structure 310b, sub array structure 310e and the sub array structure 310f can be configured to operate on the first RF communication signal at the first frequency (f1) 803, thereby providing independent beam management (IBM) for the instances of the first RF communication signal at the first frequency (f1) 803. Further, as described above, enabling a subset of the LNAs and/or phase shifters in a sub array may contribute to the provision of IBM.

In this manner, a single radio frequency communication signal can be separately received in a MIMO architecture and downconverted to two or more separate IF signals to provide M/HB MIMO using independent beam management (IBM). In an exemplary embodiment, the phased array 802 allows independent beam management (IBM) and also allows the MRTD requirement to be relaxed to approximately 8 μsec instead of the stringent common beam management (CBM) MRTD requirement of 0.26 μsec.

Figure 9:
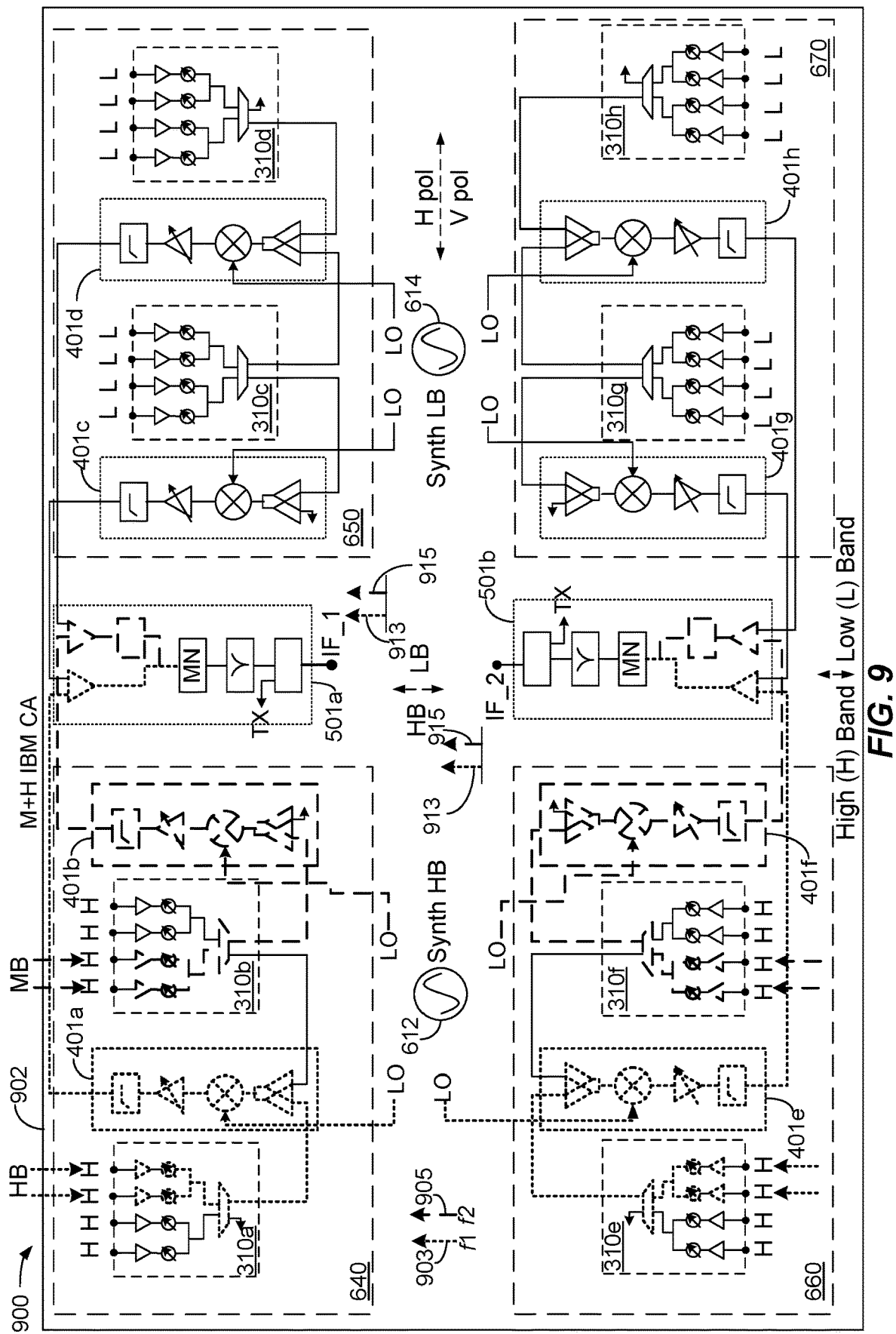
FIG. 9 shows a schematic diagram of an exemplary embodiment of a phased array.

FIG. 9 shows a schematic diagram 900 of an exemplary embodiment of a phased array 902. In FIG. 9, the phased array 902 is configured for medium+high band carrier aggregation (M+HB CA) and is configured to process two medium/high band (M/HB) signals using independent beam management (IBM). The components in this example that process a first RF communication signal at a first frequency are arbitrarily illustrated using bold dotted lines and the components in this example that process a second RF communication signal at a second frequency are arbitrarily illustrated using bold dashed lines. In an exemplary embodiment, a first RF communication signal at a first frequency (f1) is shown using the arrow 903 and a second RF communication signal at a second frequency (f2) is shown using the arrow 905. In an exemplary embodiment, the signals represented by the arrows 903 and 905 may be high or medium band signals at different frequencies in this example.

In an exemplary embodiment, the phased array 902 may be configured such that the first RF communication signal at the first frequency (f1) 903 is a high band (HB) signal and is received by the sub array structure 310a and the sub array structure 310e; and the second RF communication signal at the second frequency (f2) 905 is a medium band (MB) signal and is received by the sub array structure 310b and the sub array structure 310f. In the example shown in FIG. 9, fewer than all of the LNAs and phase shifters are enabled in the sub array structures 310a, 310b, 310e and 310f, with two exemplary LNAs and phase shifters being shown as enabled. More or fewer LNAs and phase shifters may be enabled in each sub array structure 310.

The first RF communication signal at the first frequency (f1) 903 from an H pol antenna port may be provided by the multiplexer in the sub array structure 310a to the downconverter 401a and processed by the downconverter 401a, and the first RF communication signal at the first frequency (f1)

903 from a V pol antenna port may be provided by the multiplexer in the sub array structure 310e to the downconverter 401e and processed by the downconverter 401e. For example, the downconverter 401a and the downconverter 401e may receive a local oscillator (LO) signal at a first frequency and can downconvert the first RF communication signal at the first frequency (f1) 903 to a first Intermediate frequency (IF1) signal 913.

The second RF communication signal at the second frequency (f2) 905 from an H pol antenna port may be provided by the multiplexer in the sub array structure 310b to the downconverter 401b and processed by the downconverter 401b, and the second communication signal at the second frequency (f2) 905 from a V pol antenna port may be provided by the multiplexer in the sub array structure 310f to the downconverter 401f and processed by the downconverter 401f. For example, the downconverter 401b and the downconverter 401f may receive a local oscillator (LO) signal at a second frequency and can downconvert the second RF communication signal at the second frequency (f2) 905 to a second intermediate frequency (IF2) signal 915.

An output of the downconverter 401a having the first communication signal at the first intermediate frequency (IF1) 913 may be provided to the combining circuit 501a; and an output of the downconverter 401e having the first communication signal at the first intermediate frequency (IF1) 913 may be provided to the combining circuit 501b.

An output of the downconverter 401b having the second communication signal at the second intermediate frequency (IF2) 915 may be provided to the combining circuit 501a; and an output of the downconverter 401f having the second communication signal at the second intermediate frequency (IF2) 915 may be provided to the combining circuit 501b.

An output IF_1 of the combining circuit 501a may have intermediate frequency (IF) signals 913 and 915 corresponding to the first RF communication signal at the first frequency (f1) 903, and the second RF communication signal at the second frequency (f2) 905, respectively.

An output IF_2 of the combining circuit 501b may have intermediate frequency (IF) signals 913 and 915 corresponding to the first RF communication signal at the first frequency (f1) 903, and the second RF communication signal at the second frequency (2) 905, respectively.

In an exemplary embodiment, the phase shifters in the sub array structure 310a and the sub array structure 310e can be configured to operate on the first RF communication signal at the first frequency (f1) 903; and the phase shifters in the sub array structure 310b and the sub array structure 310f can be configured to operate on the second RF communication signal at the second frequency (f2) 905, thereby providing independent beam management (IBM) for the first RF communication signal at the first frequency (f1) 903 and for the second RF communication signal at the second frequency (2) 905.

In this manner, two different radio frequency communication signals can be separately received and downconverted to IF to provide M+HB CA using independent beam management (IBM). Further, as described above, enabling less than all of the LNAs and/or phase shifters in a sub array may contribute to the provision of IBM. In an exemplary embodiment, the phased array 902 allows independent beam management (IBM) and also allows the MRTD requirement to be relaxed to approximately 8 μsec instead of the stringent common beam management (CBM) MRTD requirement of 0.26 μsec.

Figure 10:
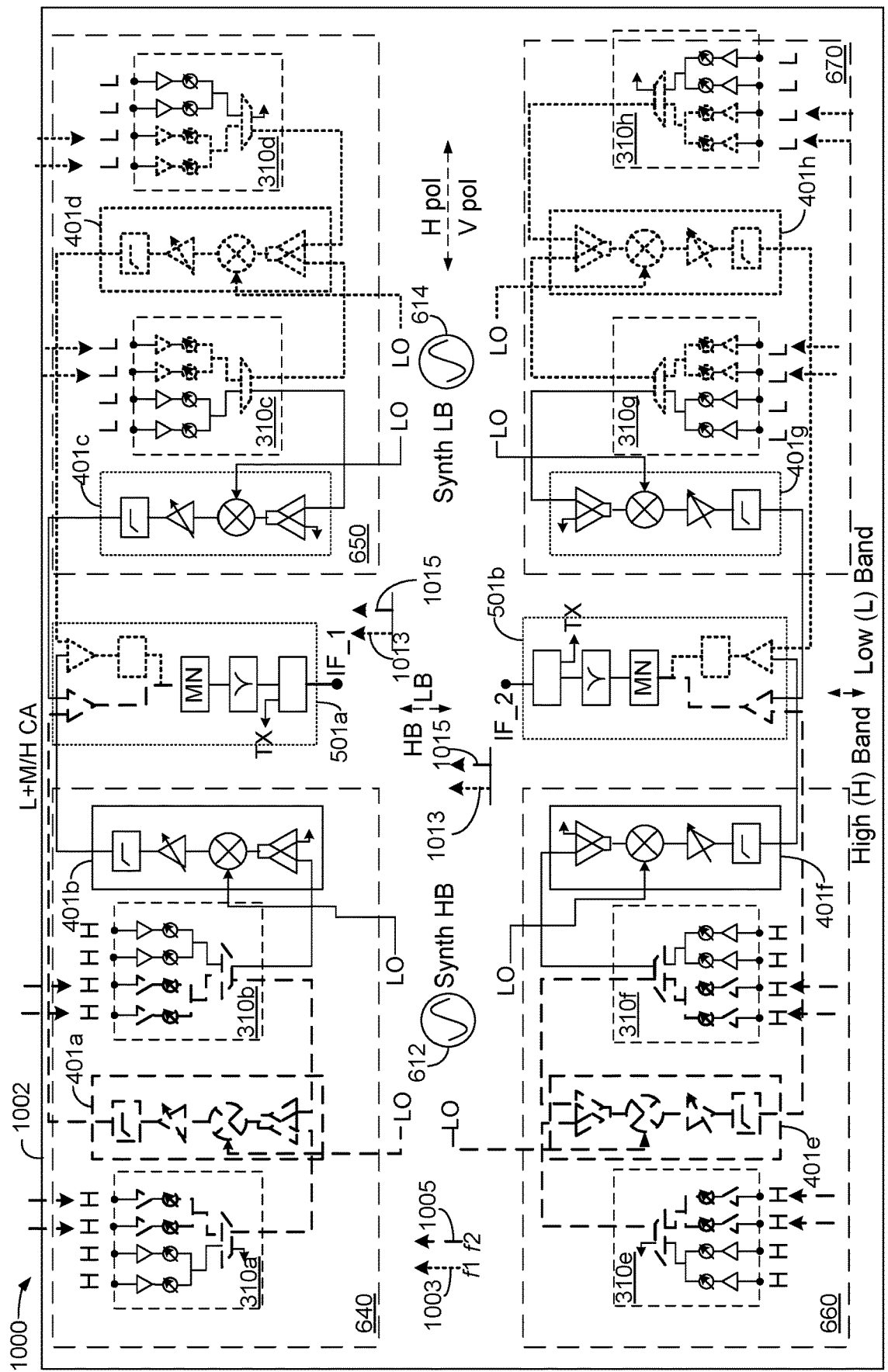
FIG. 10 shows a schematic diagram of an exemplary embodiment of a phased array.

FIG. 10 shows a schematic diagram 1000 of an exemplary embodiment of a phased array 1002. In FIG. 10, the phased array 1002 is configured for low+medium/high band carrier aggregation (L+M/H CA) and is configured to simultaneously process low band and medium/high band (L/M/H) signals using independent beam management (IBM) and carrier aggregation (CA). The components in this example that process a first communication signal at a first frequency are arbitrarily illustrated using bold dotted lines and the components in this example that process a second communication signal at a second frequency are arbitrarily illustrated using bold dashed lines. In an exemplary embodiment, a first RF communication signal at a first frequency (f1) is shown using the arrow 1003 and a second RF communication signal at a second frequency (f2) is shown using the arrow 1005. In an exemplary embodiment, the signals represented by the arrows 1003 and 1005 may be low and medium/high band signals at different frequencies in this example.

In an exemplary embodiment, the phased array 1002 may be configured such that the first RF communication signal at the first frequency (f1) 1003 is a low band (LB) signal and is received by the sub array structure 310c, the sub array structure 310d, the sub array structure 310g and the sub array structure 310h; and the second RF communication signal at the second frequency (f2) 1005 is a medium/high band (M/HB) signal and is received by the sub array structure 310a, the sub array structure 310b, the sub array structure 310e and the sub array structure 310f. . In the example shown in FIG. 8, fewer than all of the LNAs and phase shifters are enabled in the sub array structures 310a, 310b, 310c, 310d, 310e, 310f, 310g and 310h with two exemplary LNAs and phase shifters being shown as enabled. More or fewer LNAs and phase shifters may be enabled in each sub array structure 310.

The first RF communication signal at the first frequency (f1) 1003 from an H pol antenna port may be provided by the multiplexers in the sub array structures 310c and 310d to the downconverter 401d and processed by the downconverter 401d, and the first RF communication signal at the first frequency (f1) 1003 from a V pol antenna port may be provided by the multiplexers in the sub array structures 310g and 310h to the downconverter 401h and processed by the downconverter 401h. For example, the downconverter 401d and the downconverter 401h may receive a local oscillator (LO) signal at a first frequency and can downconvert the first RF communication signal at the first frequency (f1) 1003 to a first intermediate frequency (IF1) signal 1013.

The second RF communication signal at the second frequency (f2) 1005 from an H pol antenna port may be provided by the multiplexers in the sub array structures 310a and 310b to the downconverter 401a and processed by the downconverter 401a, and the second RF communication signal at the second frequency (f2) 1005 from a V pol antenna port may be provided by the multiplexers in the sub array structures 310e and 310f to the downconverter 401e and processed by the downconverter 401e. For example, the downconverter 401a and the downconverter 401e may receive a local oscillator (LO) signal at a second frequency and can downconvert the second RF communication signal at the second frequency (f2) 1005 to a second intermediate frequency (IF2) signal 1015.

An output of the downconverter 401d having the first RF communication signal at the first intermediate frequency (IF1) 1013 may be provided to the combining circuit 501a; and an output of the downconverter 401h having the first communication signal at the first intermediate frequency (IF1) 10013 may be provided to the combining circuit 501b.

An output of the downconverter 401a having the second communication signal at the second intermediate frequency (IF2) 1015 may be provided to the combining circuit 501a; and an output of the downconverter 401e having the second communication signal at the second intermediate frequency (IF2) 1015 may be provided to the combining circuit 501b.

An output IF_1 of the combining circuit 501a may have intermediate frequency (IF) signals 1013 and 1015 corresponding to the first RF communication signal at the first frequency (f1) 1003, and the second RF communication signal at the second frequency (f2) 1005, respectively.

An output IF_2 of the combining circuit 501b may have intermediate frequency (IF) signals 1013 and 1015 corresponding to the first RF communication signal at the first frequency (f1) 1003, and the second RF communication signal at the second frequency (f2) 1005, respectively.

In an exemplary embodiment, the phase shifters in the sub array structure 310c, the sub array structure 310d, the sub array structure 310g and the sub array structure 310h can be configured to operate on the first RF communication signal at the first frequency (f1) 1003; and the phase shifters in the sub array structure 310a, the sub array structure 310b, the sub array structure 310e and the sub array structure 310f can be configured to operate on the second RF communication signal at the second frequency (f2) 1005, thereby providing independent beam management (IBM) for the first RF communication signal at the first frequency (f1) 1003 and for the second RF communication signal at the second frequency (f2) 1005.

In this manner, two different radio frequency communication signals can be separately received and downconverted to IF to provide L+/MH CA using independent beam management (IBM). Further, as described above, enabling a subset of the LNAs and/or phase shifters in a sub array may contribute to the provision of IBM. In an exemplary embodiment, the phased array 1002 allows independent beam management (IBM) and also allows the MRTD requirement to be relaxed to approximately 8 μsec instead of the stringent common beam management (CBM) MRTD requirement of 0.26 μsec. In FIGS. 7-10, the data processor 210 may be coupled to the IF port (e.g., through other processing circuitry) and configured to receive processed signals (e.g., CA, MIMO, and or IBM signals) and further process them to extract information regarding wireless communications.

Figure 11:
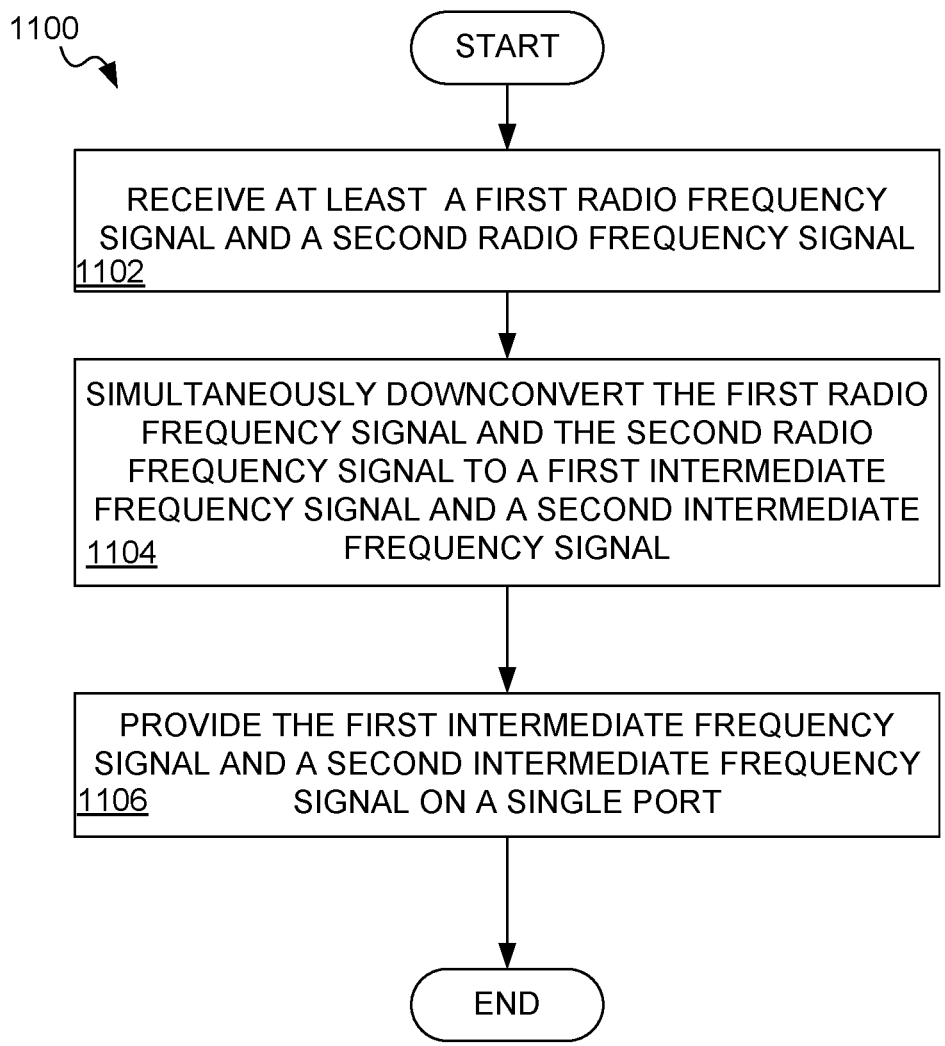
FIG. 11 is a flow chart describing an example of the operation of a method for signal processing.

FIG. 11 is a flow chart describing an example of the operation of a method 1100 for signal processing. The blocks in the method 1100 can be performed in or out of the order shown, and in some embodiments, can be performed at least in part in parallel.

In block 1102, a first radio frequency (RF) signal and a second RF signal are received at an RF receiver. For example, a first RF signal 703 at a first frequency may be received at the sub array structure 310d on the low band, H pol quadrant 650 and by the sub array structure 310h on the low band, V pol quadrant 670; and a second RF signal 705 at a second frequency may be received at the sub array structure 310c on the low band, H pol quadrant 650 and by the sub array structure 310g on the low band, V pol quadrant 670.

In block 1104, the first RF signal and the second RF signal are simultaneously downconverted to a first intermediate frequency (IF1) signal and a second IF2 signal. For example, the downconverter 401d and the downconverter 401h can downconvert the first RF signal 703 to a first IF signal 713; and the downconverter 401c and the downconverter 401g can downconvert the second RF signal 705 to a second IF signal 715.

In block 1106, the first IF signal and the second IF signal are provided on a single output port. For example, the first IF signal 713 and the second IF signal 715 may be simultaneously provided at the IF_1 port at the output of the combining circuit 501a and the first IF signal 713 and the second IF signal 715 may be simultaneously provided at the IF_2 port at the output of the combining circuit 501b.

Figure 12:
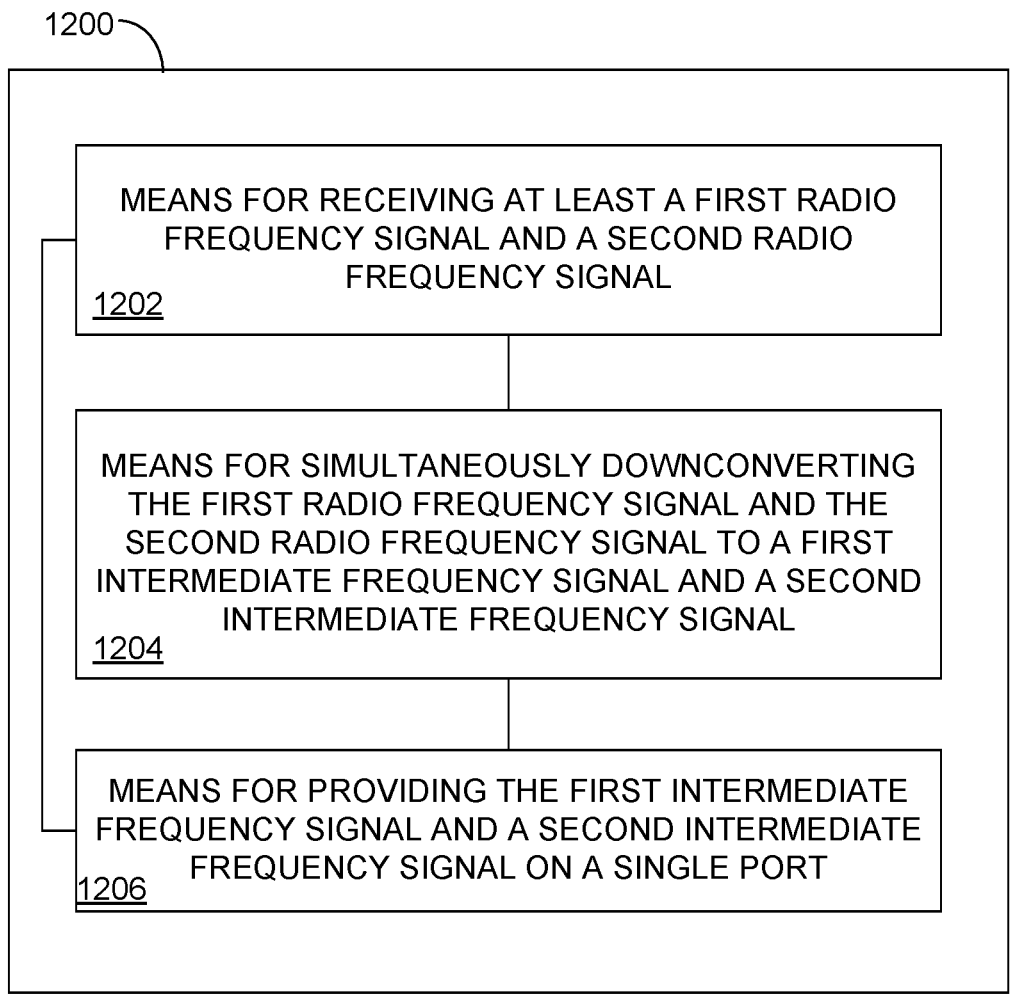
FIG. 12 is a functional block diagram of an apparatus for signal processing.

FIG. 12 is a functional block diagram of an apparatus for signal processing. The apparatus 1200 comprises means 1202 for receiving a first radio frequency (RF) signal and a second RF signal. In certain embodiments, the means 1202 for receiving a first radio frequency (RF) signal and a second RF signal can be configured to perform one or more of the functions described in operation block 1102 of method 1100 (FIG. 11). In an exemplary embodiment, the means 1202 for receiving a first RF signal and a second RF signal may comprise the sub array structure 310d on the low band, H pol quadrant 650 and the sub array structure 310h on the low band, V pol quadrant 670 configured to receive a first RF signal 703; and the sub array structure 310c on the low band, H pol quadrant 650 and the sub array structure 310g on the low band, V pol quadrant 670 configured to receive a second RF signal 705.

The apparatus 1200 also comprises means 1204 for simultaneously downconverting the first RF signal and the second RF signal to a first intermediate frequency (IF1) signal and a second IF2 signal. In certain embodiments, the means 1204 for simultaneously downconverting the first RF signal and the second RF signal to a first intermediate frequency (IF1) signal and a second IF2 signal can be configured to perform one or more of the functions described in operation block 1104 of method 1100 (FIG. 11). In an exemplary embodiment, the means 1204 for simultaneously downconverting the first RF signal and the second RF signal to a first intermediate frequency (IF1) signal and a second IF2 signal may comprise the downconverter 401d and the downconverter 401h configured to downconvert the first RF signal 703 to a first IF signal 713; and the downconverter 401c and the downconverter 401g configured to downconvert the second RF signal 705 to a second IF signal 715.

The apparatus 1200 also comprises means 1206 for providing the first IF signal and the second IF signal on a single output port. In certain embodiments, the means 1206 for providing the first IF signal and the second IF signal on a single output port can be configured to perform one or more of the functions described in operation block 1106 of method 1100 (FIG. 11). In an exemplary embodiment, the means 1206 for providing the first IF signal and the second IF signal on a single output port may comprise circuitry configured to simultaneously provide the first IF signal 713 and the second IF signal 715 at the IF_1 port at the output of the combining circuit 501a and circuitry configured to simultaneously provide the first IF signal 713 and the second IF signal 715 at the IF_2 port at the output of the combining circuit 501b, for example the combining circuit(s) 501.

Figure 13:
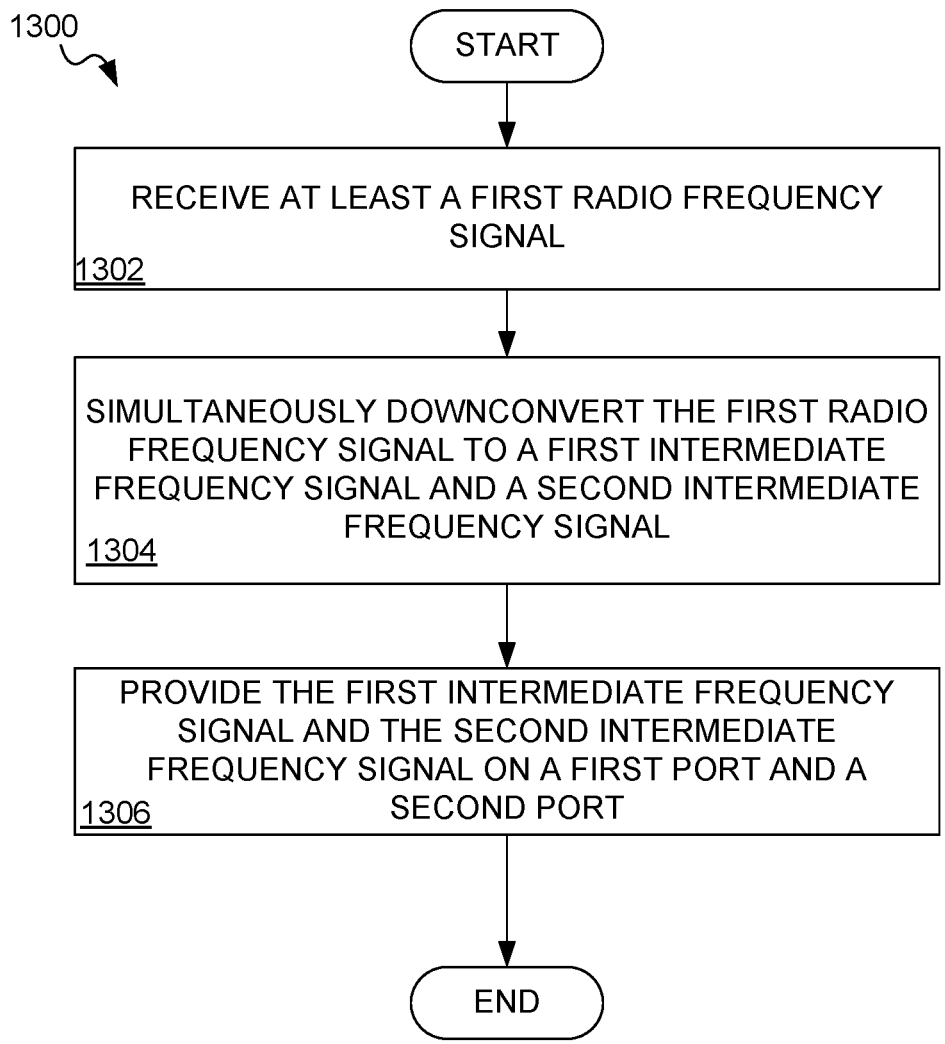
FIG. 13 is a flow chart describing an example of the operation of a method for signal processing.

FIG. 13 is a flow chart describing an example of the operation of a method 1300 for signal processing. The blocks in the method 1300 can be performed in or out of the order shown, and in some embodiments, can be performed at least in part in parallel.

In block 1302, a first radio frequency (RF) signal is received at an RF receiver. For example, a first RF signal 803 may be received at the sub array structure 310a on the high band, H pol quadrant 640 and by the sub array structure 310e on the high band, V pol quadrant 660; and the first RF signal 803 may be received at the sub array structure 310b on the high band, H pol quadrant 640 and by the sub array structure 310*f* on the high band, V pol quadrant 660.

In block 1304, the first RF signal is simultaneously downconverted to a first intermediate frequency (IF1) signal and a second intermediate frequency (IF2) signal. For example, the downconverter 401*a* and the downconverter 401*e* can downconvert the first RF signal 803 to a first IF signal 813; and the downconverter 401*b* and the downconverter 401*f* can downconvert the first RF signal 803 to a second IF signal 817.

In block 1306, the first IF signal 813 and the second IF signal 817 are provided on a first output port and on a second output port. For example, the first IF signal 813 and the second IF signal 817 may be simultaneously provided at the IF_1 port at the output of the combining circuit 501*a* and at the IF_2 port at the output of the combining circuit 501*b*.

Figure 14:
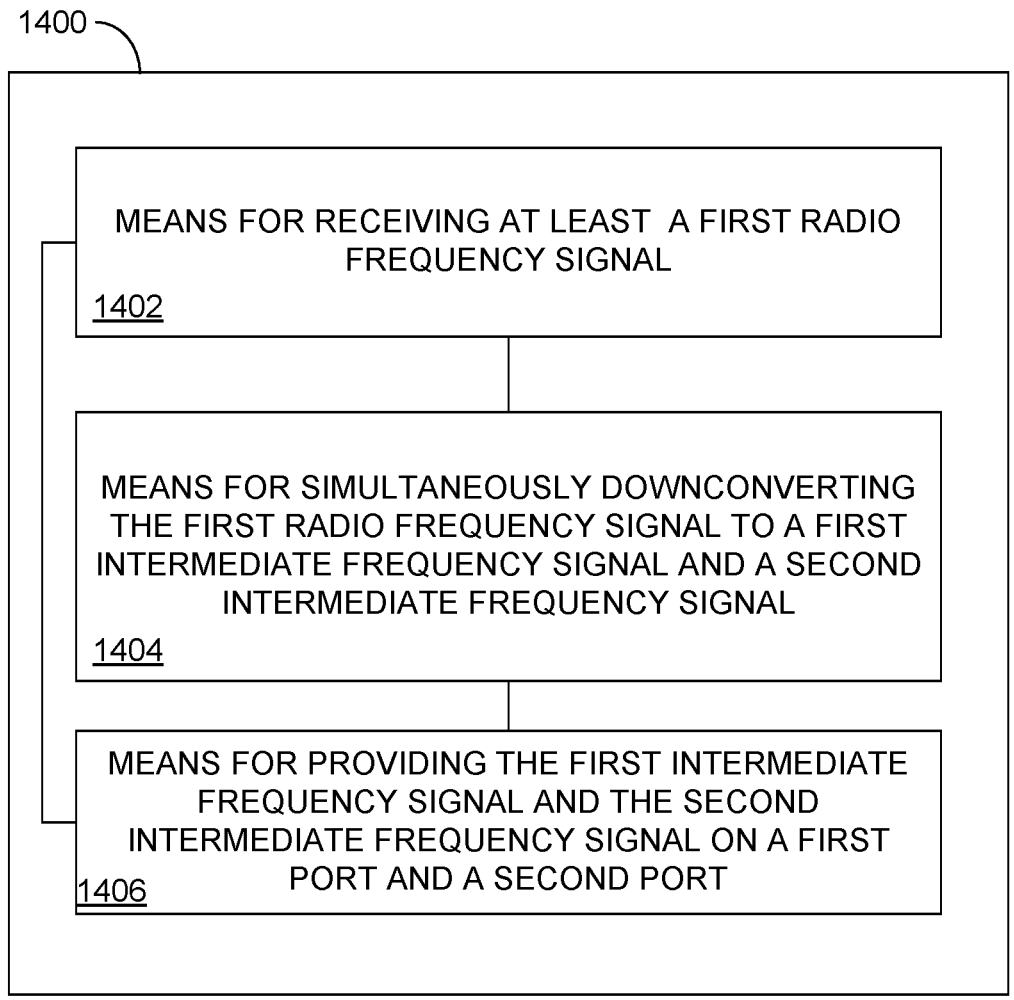
FIG. 14 is a functional block diagram of an apparatus for signal processing.

FIG. 14 is a functional block diagram of an apparatus for signal processing. The apparatus 1400 comprises means 1402 for receiving a first radio frequency (RF) signal at an RF receiver. In certain embodiments, the means 1402 for receiving a first radio frequency (RF) signal at an RF receiver can be configured to perform one or more of the functions described in operation block 1302 of method 1300 (FIG. 13). In an exemplary embodiment, the means 1402 for receiving a first radio frequency (RF) signal at an RF receiver may comprise the sub array structure 310*a* being configured to receive a first RF signal 803 on the high band, H pol quadrant 640 and the sub array structure 310*e* on configured to receive the first RF signal 803 on the high band, V pol quadrant 660; and the sub array structure 310*b* being configured to receive the first RF signal 803 on the high band, H pol quadrant 640 and the sub array structure 310*f* being configured to receive the first signal 803 on the high band, V pol quadrant 660.

The apparatus 1400 also comprises means 1404 for simultaneously downconverting the first RF signal to a first intermediate frequency (IF1) signal and to a second intermediate frequency (IF2) signal. In certain embodiments, the means 1404 for simultaneously downconverting the first RF signal to a first intermediate frequency (IF1) signal and to a second intermediate frequency (IF2) signal can be configured to perform one or more of the functions described in operation block 1304 of method 1300 (FIG. 13). In an exemplary embodiment, the means 1404 for simultaneously downconverting the first RF signal to a first intermediate frequency (IF1) signal and to a second intermediate frequency (IF2) signal may comprise the downconverter 401*a* and the downconverter 401*e* configured to downconvert the first RF signal 803 to a first IF signal 813; and the downconverter 401*b* and the downconverter 401*f* configured to downconvert the first RF signal 803 to the second IF signal 817.

The apparatus 1400 also comprises means 1406 for providing the first IF1 signal and the second IF2 signal on a first output port and on a second output port. In certain embodiments, the means 1406 for providing the first IF1 signal and the second If2 signal on a first output port and on a second output port can be configured to perform one or more of the functions described in operation block 1306 of method 1300 (FIG. 13). In an exemplary embodiment, the means 1406 for providing the first IF1 signal and the second IF2 signal on a first output port and on a second output port may comprise a circuit configured to simultaneously provide the first IF1 signal 813 and the second IF2 signal 817 at the IF_1 port at the output of the combining circuit 501*a* and circuitry configured to simultaneously provide the first IF1 signal 813 and the second IF2 signal 817 at the IF_2 port at the output of the combining circuit 501*b*, for example the combining circuit(s) 501.

Implementation examples are described in the following numbered clauses:

1. A receive system for performing carrier aggregation (CA) and multiple input multiple output (MIMO) operation at millimeter wave (mmW) frequencies, comprising a phased array having a plurality of groupings each having a pair of sub array structures, each sub array structure having a plurality of phased array elements and a multiplexer, each phased array element coupled to an antenna element, each phased array element having a low noise amplifier (LNA) and a phase shifter (PS), the plurality of groupings comprising a first high band (HB) grouping and a first low band (LB) grouping; a downconverter circuit selectively connected to each sub array structure in the first high band (HB) grouping and the first low band (LB) grouping, each downconverter circuit having a radio frequency (RF) amplifier, a mixer, an intermediate frequency (IF) amplifier, and a filter; and a combining circuit connected to each of the downconverter circuits selectively connected to the first high band (HB) grouping and the first low band (LB) grouping, the combining circuit configured to provide signals from each downconverter circuit to an intermediate frequency (IF) port.

2. The system of clause 1, further comprising: a first (HB) synthesizer configured to generate a first local oscillator (LO) signal; and a second (LB) synthesizer configured to generate a second local oscillator (LO) signal, the first and second LO signals configured to be provided to any of the downconverter circuits.

3. The system of any of clauses 1 or 2, wherein each sub array structure is configured to provide independent beam management including independent phase shifting among the sub array structures.

4. The system of any of clauses 2 through 3, wherein the antenna elements comprise a split antenna array and are configured to realize independent beamforming (IBF) for interband carrier aggregation (CA) and 4×4 multiple input multiple output (MIMO) signal processing.

5. The system of any of clauses 2 through 4, wherein the receive system is configured to receive at least two radio frequency signals having different frequencies at two or more sub array structures.

6. The system of any of clauses 2 through 5, wherein the receive system is configured to receive at least two radio frequency signals having the same frequency at two or more sub array structures.

7. The system of clause 5, wherein the receive system is configured to simultaneously downconvert the two radio frequency signals at different frequencies to corresponding first and second intermediate frequency signals and provide the first and second intermediate frequency signals on a single output pin.

8. The system of clause 6, wherein the receive system is configured to simultaneously downconvert the two radio frequency signals at the same radio frequency to a first intermediate frequency signal and a second intermediate frequency signal and simultaneously provide the first intermediate frequency signal and the second intermediate frequency signal on a single output port.

9. The system of any of clauses 2 through 8, wherein the plurality of groupings comprise four quadrants and each antenna element has a horizontal polarity output and a vertical polarity output.

10. The system of any of clauses 2 through 9, wherein the IF port comprises at least a first output pin (IF_1), where a first intermediate frequency (IF) signal and a second IF signal are provided on the first output pin (IF_1)

11. A method for signal processing, comprising: receiving at least two radio frequency (RF) signals at a receiver; selectively phase shifting the at least two radio frequency (RF) signals; selectively directing the at least two phase shifted radio frequency (RF) signals to selected downconverter circuits; downconverting simultaneously the at least two RF signals to intermediate frequency (IF) signals; and connecting the at least two IF signals to at least one selected output port.

12. The method of clause 11, wherein the at least two radio frequency signals have different frequencies and are received at different receiver sub array structures.

13. The method of any of clauses 11 through 12, wherein the at least two radio frequency signals have the same frequency and are received at different receiver sub array structures.

14. The method of any of clauses 11 through 13, further comprising selectively routing the at least two IF signals from any of a plurality of sub array structures to any of a first output port and a second output port.

15. The method of any of clauses 11 through 14, further comprising selectively amplifying and phase shifting the at least two RF signals.

16. A device, comprising: means for receiving at least two radio frequency (RF) signals at a receiver; means for selectively phase shifting the at least two radio frequency (RF) signals; means for selectively directing the at least two phase shifted radio frequency (RF) signals to selected downconverter circuits; means for downconverting simultaneously the at least two RF signals to intermediate frequency (IF) signals; and means for connecting the at least two IF signals to at least one selected output port.

17. The device of clause 16, further comprising means for receiving the at least two radio frequency signals having different frequencies at different receiver sub array structures.

18. The device of any of clauses 16 through 17, further comprising means for receiving the at least two radio frequency signals having the same frequency at different receiver sub array structures.

19. The device of any of clauses 16 through 18, further comprising means for selectively routing the at least two IF signals from any of a plurality of sub array structures to any of a first output port and a second output port.

20. The device of any of clauses 16 through 19, further comprising means for selectively amplifying and phase shifting the at least two RF signals.

21. A radio system architecture, comprising: a receiver having multiple sub arrays in a phased array, the multiple sub arrays configured to perform carrier aggregation (CA) and multiple input multiple output (MIMO) signal processing, and provide independent beam management for multiple radio frequency (RF) signals received at each of the multiple sub arrays; and a data processor configured to receive signals from the receiver and extract information regarding wireless communications.

22. The radio system architecture of clause 21, wherein the phased array has 16 antenna elements.

23. The radio system architecture of any of clauses 21 through 22, wherein at least two radio frequency signals are received at two or more sub arrays and have different frequencies.

24. The radio system architecture of any of clauses 21 through 22, wherein at least two radio frequency signals are received at two or more sub arrays and have the same frequency.

25. The radio system architecture of any of clauses 21 through 24, wherein the architecture is configured to simultaneously downconvert the two radio frequency signals at different frequencies to corresponding first and second intermediate frequency signals and provide the first and second intermediate frequency signals on a single output port.

26. The radio system architecture of any of clauses 21 through 24, wherein the architecture is configured to simultaneously downconvert the two radio frequency signals at the same radio frequency to a first intermediate frequency signal and a second intermediate frequency signal and simultaneously provide the first intermediate frequency signal and the second intermediate frequency signal on a single output port.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A receive system for performing carrier aggregation (CA) and multiple input multiple output (MIMO) operation at millimeter wave (mmW) frequencies, comprising:
a phased array having a plurality of groupings each having a pair of sub array structures, each sub array structure having a plurality of phased array elements and a multiplexer, each phased array element coupled to an antenna element, each phased array element having a low noise amplifier (LNA) and a phase shifter (PS), the plurality of groupings comprising a first high band (HB) grouping and a first low band (LB) grouping;
a downconverter circuit selectively connected to each sub array structure in the first high band (HB) grouping and the first low band (LB) grouping, each downconverter circuit having a radio frequency (RF) amplifier, a mixer, an intermediate frequency (IF) amplifier, and a filter; and
a combining circuit connected to each of the downconverter circuits selectively connected to the first high band (HB) grouping and the first low band (LB)

grouping, the combining circuit configured to provide signals from each downconverter circuit to an intermediate frequency (IF) port.

2. The system of claim 1, further comprising:
a first (HB) synthesizer configured to generate a first local oscillator (LO) signal; and
a second (LB) synthesizer configured to generate a second local oscillator (LO) signal, the first and second LO signals configured to be provided to any of the downconverter circuits.

3. The system of claim 1, wherein each sub array structure is configured to provide independent beam management including independent phase shifting among the sub array structures.

4. The system of claim 1, wherein the antenna elements comprise a split antenna array and are configured to realize independent beamforming (IBF) for interband carrier aggregation (CA) and 4×4 multiple input multiple output (MIMO) signal processing.

5. The system of claim 1, wherein the receive system is configured to receive at least two radio frequency signals having different frequencies at two or more sub array structures.

6. The system of claim 5, wherein the receive system is configured to simultaneously downconvert the two radio frequency signals at different frequencies to corresponding first and second intermediate frequency signals and provide the first and second intermediate frequency signals on a single output port.

7. The system of claim 1, wherein the receive system is configured to receive at least two radio frequency signals having the same frequency at two or more sub array structures.

8. The system of claim 7, wherein the receive system is configured to simultaneously downconvert the two radio frequency signals at the same radio frequency to a first intermediate frequency signal and a second intermediate frequency signal and simultaneously provide the first intermediate frequency signal and the second intermediate frequency signal on a single output port.

9. The system of claim 1, wherein the plurality of groupings comprise four quadrants and each antenna element has a horizontal polarity output and a vertical polarity output.

10. The system of claim 1, wherein the IF port comprises at least a first output pin (IF_1), where a first intermediate frequency (IF) signal and a second IF signal are provided on the first output pin (IF_1).

11. A method for signal processing, comprising:
receiving at least two radio frequency (RF) signals at a receiver, wherein the at least two radio frequency signals are received at different receiver sub array structures;
selectively phase shifting the at least two radio frequency (RF) signals;
selectively directing the at least two phase shifted radio frequency (RF) signals to selected downconverter circuits;
downconverting simultaneously the at least two RF signals to intermediate frequency (IF) signals; and
connecting the at least two IF signals to at least one selected output port.

12. The method of claim 11, wherein the at least two radio frequency signals have different frequencies.

13. The method of claim 11, wherein the at least two radio frequency signals have the same frequency.

14. The method of claim 11, further comprising selectively routing the at least two IF signals from any of a plurality of sub array structures to any of a first output port and a second output port.

15. The method of claim 11, further comprising selectively amplifying and phase shifting the at least two RF signals.

16. A device, comprising:
means for receiving at least two radio frequency (RF) signals at different sub array structures of a receiver;
means for selectively phase shifting the at least two radio frequency (RF) signals;
means for selectively directing the at least two phase shifted radio frequency (RF) signals to selected downconverter circuits;
means for downconverting simultaneously the at least two RF signals to intermediate frequency (IF) signals; and
means for connecting the at least two IF signals to at least one selected output port.

17. The device of claim 16, wherein the at least two radio frequency signals have different frequencies.

18. The device of claim 16, wherein the at least two radio frequency signals have the same frequency.

19. The device of claim 16, further comprising means for selectively routing the at least two IF signals from any of a plurality of sub array structures to any of a first output port and a second output port.

20. The device of claim 16, further comprising means for selectively amplifying and phase shifting the at least two RF signals.

21. A radio system architecture, comprising:
a receiver having multiple sub arrays in a phased array, the multiple sub arrays configured to perform carrier aggregation (CA) and multiple input multiple output (MIMO) signal processing, and provide independent beam management for multiple radio frequency (RF) signals received at each of the multiple sub arrays; and
a data processor configured to receive signals from the receiver and extract information regarding wireless communications.

22. The radio system architecture of claim 21, wherein the phased array has 16 antenna elements.

23. The radio system architecture of claim 21, wherein at least two radio frequency signals are received at two or more sub arrays and have different frequencies.

24. The radio system architecture of claim 23, wherein the architecture is configured to simultaneously downconvert the two radio frequency signals at different frequencies to corresponding first and second intermediate frequency signals and provide the first and second intermediate frequency signals on a single output port.

25. The radio system architecture of claim 21, wherein at least two radio frequency signals are received at two or more sub arrays and have the same frequency.

26. The radio system architecture of claim 25, wherein the architecture is configured to simultaneously downconvert the two radio frequency signals at the same radio frequency to a first intermediate frequency signal and a second intermediate frequency signal and simultaneously provide the first intermediate frequency signal and the second intermediate frequency signal on a single output port.

* * * * *